(12) United States Patent
Jung

(10) Patent No.: US 9,417,776 B2
(45) Date of Patent: Aug. 16, 2016

(54) MEDIA REPRODUCING APPARATUS AND METHOD

(71) Applicant: HANWHA TECHWIN CO., LTD., Changwon-Si (KR)

(72) Inventor: Hyung-Ho Jung, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 140 days.

(21) Appl. No.: 14/085,038

(22) Filed: Nov. 20, 2013

(65) Prior Publication Data

US 2014/0149862 A1 May 29, 2014

(30) Foreign Application Priority Data

Nov. 27, 2012 (KR) .......................... 10-2012-0135566
Aug. 6, 2013 (KR) .......................... 10-2013-0093334

(51) Int. Cl.
*G06F 3/0484* (2013.01)
*G06F 3/0488* (2013.01)
*G06F 3/048* (2013.01)

(52) U.S. Cl.
CPC .......... *G06F 3/04847* (2013.01); *G06F 3/0488* (2013.01)

(58) Field of Classification Search
CPC ........ G06F 3/04847; G06F 3/16; G06F 3/167
See application file for complete search history.

(56) References Cited

U.S. PATENT DOCUMENTS

| 2006/0028454 | A1* | 2/2006 | Branton ............. G06F 3/03547 345/173 |
| 2008/0194326 | A1* | 8/2008 | Brunet De Courssou et al. ............................. 463/31 |
| 2008/0205681 | A1* | 8/2008 | Norberg et al. ............... 381/334 |
| 2010/0134428 | A1* | 6/2010 | Oh ................................. 345/173 |
| 2013/0332373 | A1* | 12/2013 | Marshall ...................... 705/313 |
| 2014/0006953 | A1* | 1/2014 | Kim .............................. 715/727 |
| 2014/0313153 | A1* | 10/2014 | Ootake ......................... 345/173 |

FOREIGN PATENT DOCUMENTS

| JP | 2007-66636 A | 3/2007 |
| KR | 10-2008-0070172 A | 7/2008 |
| KR | 10-2009-0072096 A | 7/2009 |
| KR | 10-2010-0053001 A | 5/2010 |

* cited by examiner

*Primary Examiner* — William Bashore
*Assistant Examiner* — Jeanette J Parker
(74) *Attorney, Agent, or Firm* — Sughrue Mion, PLLC

(57) ABSTRACT

A media reproducing apparatus may include a main body; a touch wheel button unit disposed in a region of the main body; and a control unit configured to perform a first function in response to receiving a first drag operation in a circumferential direction while a first start point disposed in the touch wheel button unit is touched, and perform a second function in response to receiving a second drag operation in the circumferential direction while a second start point, which is different from the first start point, is touched. The media reproducing apparatus may also include the region of the main body configured as a touch panel.

16 Claims, 11 Drawing Sheets

FIG. 3A
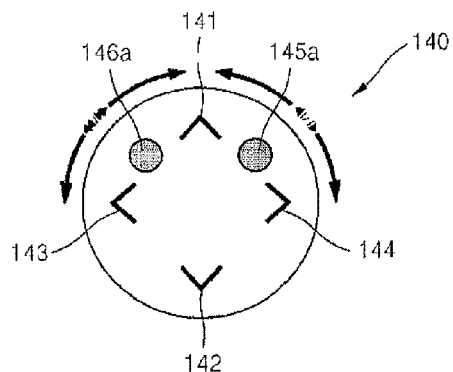
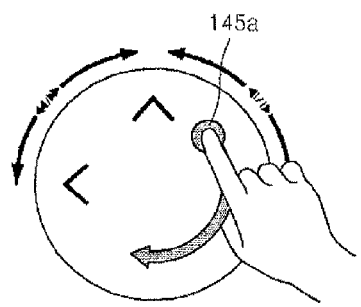
FIG. 3B-1
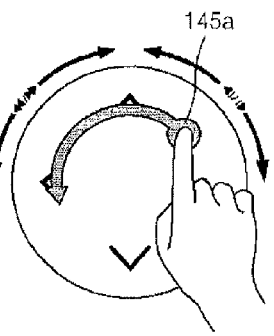
FIG. 3B-2
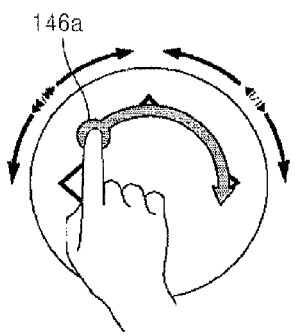
FIG. 3C-1
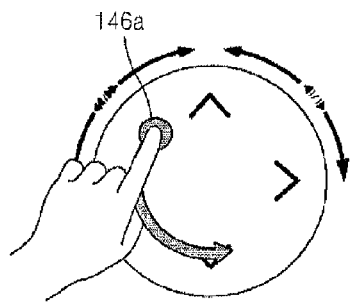
FIG. 3C-2

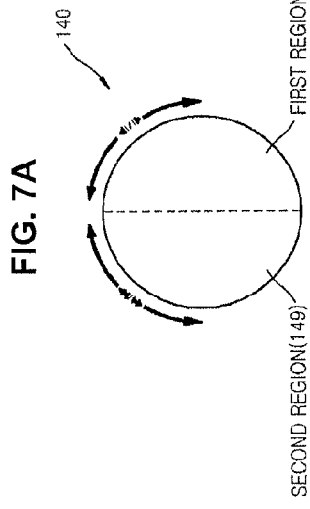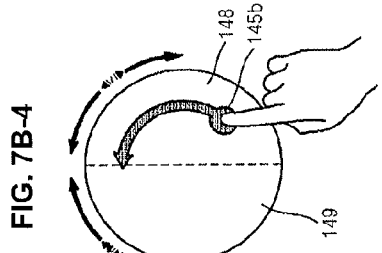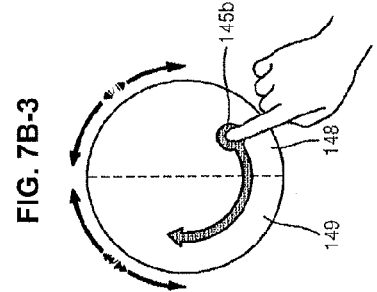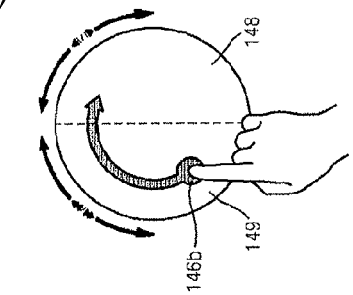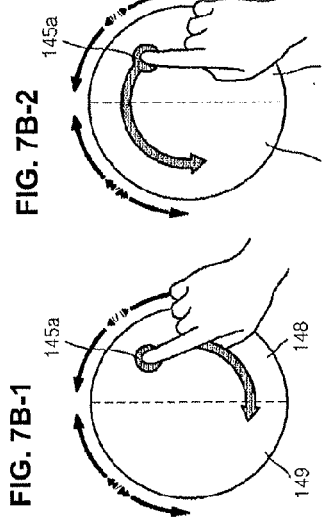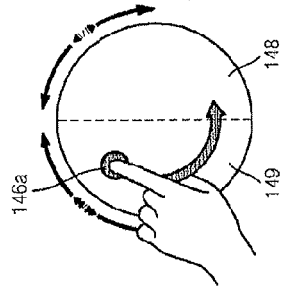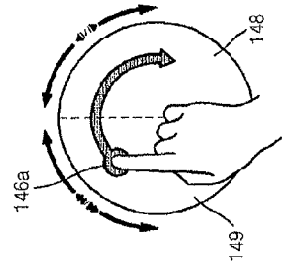

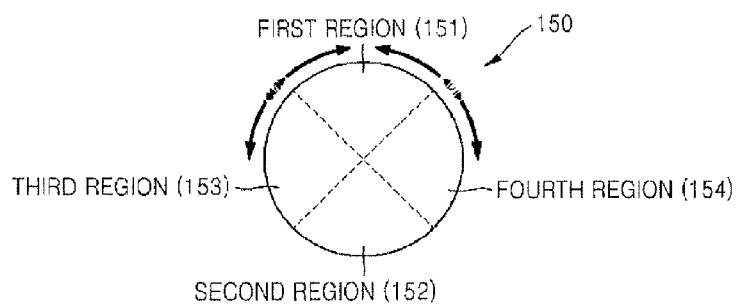
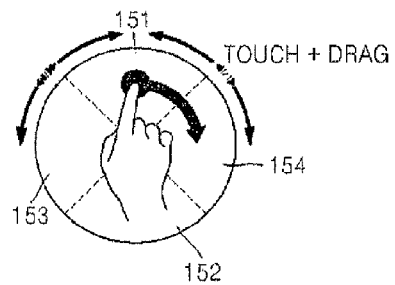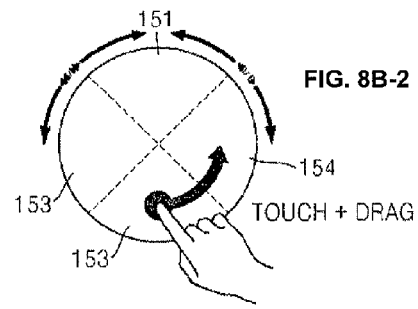
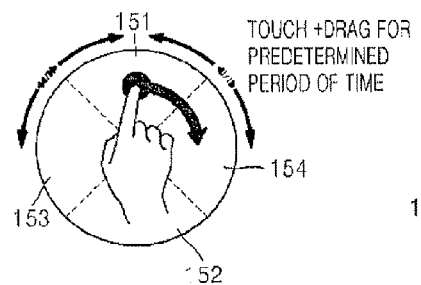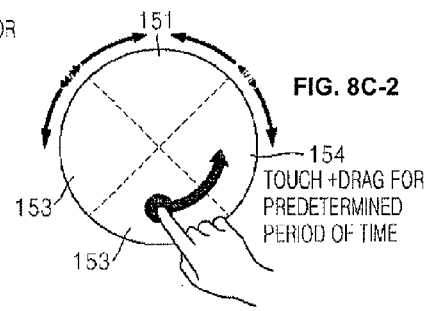
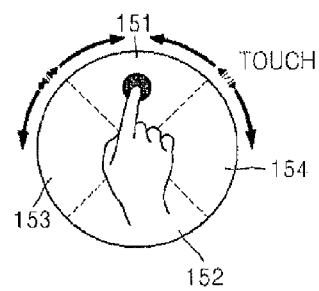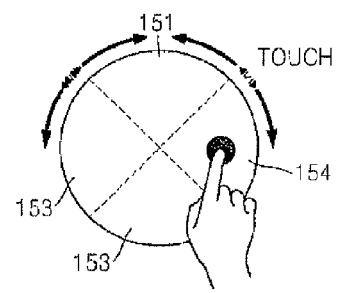

MEDIA REPRODUCING APPARATUS AND METHOD

CROSS-REFERENCE TO RELATED APPLICATIONS

This application claims priority from Korean Patent Application No. 10-2012-0135566, filed on Nov. 27, 2012, and Korean Patent Application No. 10-2013-0093334, filed on Aug. 6, 2013, in the Korean Intellectual Property Office, the disclosure of which is incorporated herein in its entirety by reference.

BACKGROUND

1. Field

One or more embodiments relate to a media reproducing apparatus. In particular, exemplary embodiments relate to a media reproducing apparatus including a touch wheel which is configured as a touch panel in a region of the media reproducing apparatus and performs a plurality of functions and a media reproducing method.

2. Description of the Related Art

In an information communication field, an information and environment rapidly changes. Therefore, a mobile communication terminal, such as a cellular phone strives to perform various functions in a limited space. In the information communication field, convergence provides various functions using one device. However, this causes the one terminal to increase in complexity in order to perform various functions. In response to the increase in complexity, an input unit is installed in the one terminal to perform the various functions. However, if the input unit becomes too complicated, the one terminal needs a greater area to provide improved user convenience.

SUMMARY

One or more exemplary embodiments provide a media reproducing apparatus including a touch wheel which is configured as a touch panel in a region of the media reproducing apparatus, and performs a plurality of functions and a media reproducing method. The plurality of functions may be implemented using the touch wheel button without having to extend an area of the touch panel. Therefore, a user is provided with an additional function without an increased product cost.

According to at least one aspect of the exemplary embodiments, there is provided a media reproduction apparatus which may include: a main body; a touch wheel button unit disposed in a region of the main body; and a control unit configured to perform a first function in response to receiving a first drag operation in a circumferential direction while a first start point disposed in the touch wheel button unit is touched, and perform a second function in response to receiving a second drag operation in the circumferential direction while a second start point, which is different from the first start point, is touched. The region of the main body is configured as a touch panel.

The touch wheel button may include: a first region including the first start point; and a second region including the second start point.

The first start point and the second start point may be easily identified by a user in the touch wheel button.

The touch wheel button may further include: an up button, a down button, a left button; and a right button, wherein each of the up button, the down button, the left button, and the right button is spaced apart from one another in the circumferential direction.

The touch wheel button may further include: a first region, a second region, a third region, and a fourth region, wherein each of the first region, the second region, the third region, and the fourth region is configured to be disposed between two of the up button, the down button, the left button, and the right button.

At least one region of the first region, the second region, the third region, and the fourth region may include the first start point, and at least one another region of the first region, the second region, the third region, and the fourth region may include the second start point.

At least two regions of the first region, the second region, the third region, and the fourth region may include the first start point, and two other regions besides the at least two regions may include the second start point.

The touch wheel button may further include: a select button configured to be disposed in an inner center portion of the up button, the down button, the left button, and the right button.

The control unit may be configured to output a first audio signal when performing the first function, and output a second audio signal when performing the second function.

According to an aspect of the exemplary embodiments, there is provided a media reproduction apparatus which may include: a main body; a touch wheel button unit disposed in a region of the main body; and a control unit configured to perform a first function in response to receiving a first drag operation in a circumferential direction while an optional start point disposed in the touch wheel button unit is touched, and perform a second function in response to receiving a second drag operation in the circumferential direction after the optional start point disposed in the touch wheel button unit is touched for a predetermined period of time, wherein the region of the main body is configured as a touch panel.

The touch wheel button may include: a first region, a second region, a third region, and a fourth region, wherein each of the first region, the second region, the third region, and the fourth region is spaced apart from one another in the circumferential direction.

The control unit may be configured to perform the first function in response to receiving a drag operation from one region of the first region, the second region, the third region, and the fourth region, as a touch start point, to at least another region of the first region, the second region, the third region, and the fourth region.

The control unit may be configured to perform the second function in response to receiving a drag operation from one region of the first region, the second region, the third region, and the fourth region, as a touch start point, to at least another region of the first region, the second region, the third region, and the fourth region while the one region is touched, after the one region is touched for a predetermined period of time.

The touch wheel button may further include: an up button, a down button, a left button, and a right button, wherein the up button, the left button, and the right button correspond to the first region, the second region, the third region, and the fourth region, respectively.

The control unit may be configured to perform a function of a button which corresponds to a firstly touched region by receiving a touch signal of a boundary line contacting two regions of the first through fourth regions.

The control unit may be configured to perform a function of a button which corresponds to a firstly touched region by receiving a touch signal of a boundary line contacting two regions of the first through fourth regions.

The control unit may be configured to output a first audio signal when performing the first function, output a second audio signal when performing the second function, and output a third audio signal when at least one of the up button, the down button, the left button, and the right button is touched.

According to an aspect of the exemplary embodiments, there is provided a media reproduction method according to an operation of a touch wheel button unit disposed in one region of a media reproduction apparatus of which the one region is configured as a touch panel. The media reproduction method may include: performing a first function in response to receiving a first drag operation in a circumferential direction while a first start point disposed in the touch wheel button unit is touched; and performing a second function in response to receiving a second drag operation in the circumferential direction while a second start point, which is different from the first start point is touched.

According to an aspect of the exemplary embodiments, there is provided a media reproduction method according to an operation of a touch wheel button unit disposed in one region of a media reproduction apparatus of which the one region is configured as a touch panel. This media reproduction method may include: performing a first function in response to receiving a first drag operation in a circumferential direction while an optional start point disposed in the touch wheel button unit is touched; and performing a second function in response to receiving a second drag operation in the circumferential direction after the optional start point disposed in the touch wheel button unit is touched for a predetermined period of time.

The media reproduction method may further include: outputting a first audio signal when performing the first function; and outputting a second audio signal when performing the second function.

The media reproduction method may further include: performing a function of a corresponding button in response to receiving a touch signal of one of an up button, a down button, a left button, and a right button which are spaced apart from one another in the touch wheel button unit in a circumferential direction.

BRIEF DESCRIPTION OF THE DRAWINGS

These and/or other aspects will become apparent and more readily appreciated from the following description of the embodiments, taken in conjunction with the accompanying drawings of which:

FIGS. 3A through 3C-2 are diagrams for explaining a touch wheel button unit according to an exemplary embodiment;

FIGS. 4A through 4C-2 are diagrams for explaining a touch wheel button unit according to another exemplary embodiment;

FIGS. 7A through 7C-4 are diagrams for explaining a touch wheel button unit according to another exemplary embodiment;

FIGS. 8A through 8D-2 are diagrams for explaining a touch wheel button unit according to another exemplary embodiment;

DETAILED DESCRIPTION OF EXEMPLARY EMBODIMENTS

Figure 1:
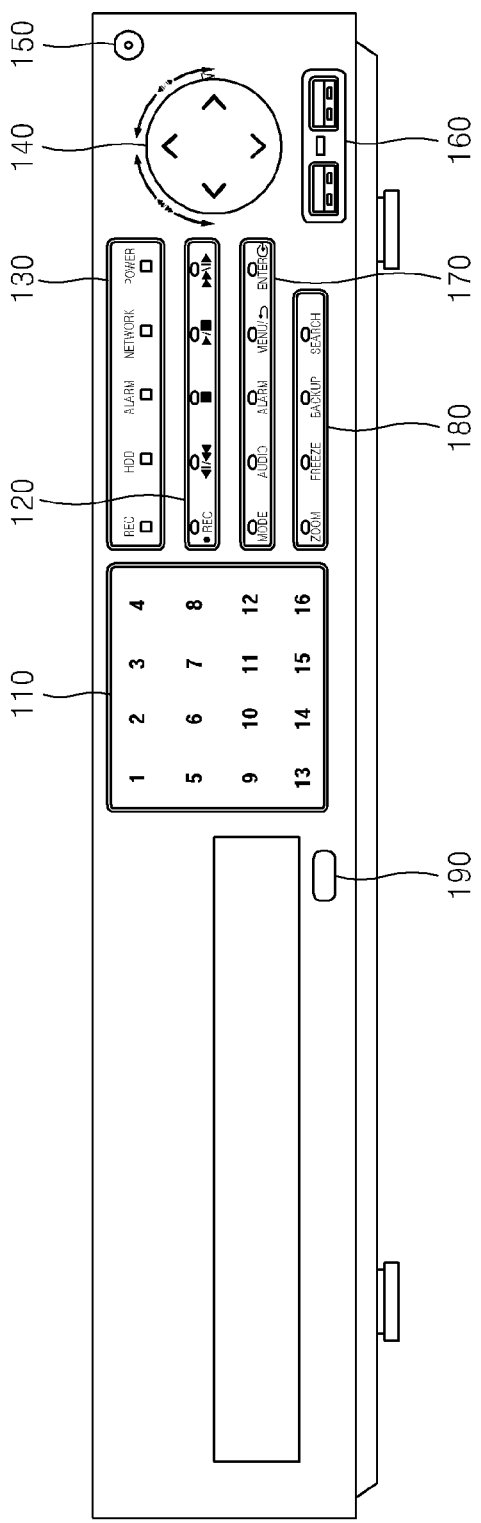
FIG. 1 is a front view of a media reproducing apparatus according to an exemplary embodiment.

Exemplary embodiments may allow various kinds of change or modification and various changes in form. Specific embodiments will be illustrated in drawings and described in detail in the specification. However, it should be understood that the specific embodiments do not limit the exemplary embodiments to a specific form, and include every modified, equivalent, or replaced one within the spirit and technical scope of the exemplary embodiments. In the following description, well-known functions or constructions will not be described in detail so as not to obscure the exemplary embodiments with unnecessary detail.

Although terms, such as 'first' and 'second', may be used to describe various elements, the elements are not limited by the terms. The terms may be used to classify a certain element from another element.

The terminology used herein is used only to describe specific embodiments and does not have any intention to limit the exemplary embodiments. An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

The exemplary embodiments may be represented with functional blocks and various processing steps. These functional blocks may be implemented by various numbers of hardware and/or software configurations for executing specific functions. For example, the exemplary embodiments may adopt direct circuit configurations, such as memory, processing, logic, and look-up table, for executing various functions under control of one or more processors or by other control devices. The components of the exemplary embodiments may execute the various functions with software programming or software elements. Similarly, the exemplary embodiments may be implemented by a programming or scripting language, such as C, C++, Java, or assembler, with various algorithms implemented by a combination of a data structure, processes, routines, and/or other programming components. Functional aspects may be implemented with algorithms executed in one or more processors. In addition, the exemplary embodiments may adopt the prior art for electronic environment setup, signal processing and/or data processing. The terms, such as "mechanism", "element", "means", and "configuration", may be widely used and are not limited to mechanical and/or physical configurations. The terms may include the meaning of a series of routines of software in association with a processor.

Hereinafter, the exemplary embodiments will be described more fully with reference to the accompanying drawings, in which embodiments are shown Like reference numerals in the drawings denote like elements. Thus, their repetitive description will be omitted. As used herein, the term "and/or" includes any and all combinations of one or more of the associated listed items.

FIG. 1 is a front view of a media reproducing apparatus according to an embodiment.

The media reproducing apparatus may be a digital video recorder (DVR) that reproduces an image stored in a recording medium using a hard disk drive (HDD) or a digital video disc (DVD). Further, the media reproducing apparatus may be a network video recorder (NVR) that transmits, stores, and monitors an image in a surveillance zone using an Internet protocol to survey the image.

Referring to FIG. 1, a region of a front portion of the media reproducing apparatus is configured as a touch panel or a touch screen. In this regard, the touch panel or the touch screen is a user interface apparatus which detects a touch spot when an input means, such as a finger or an object, contacts (or touches) the touch panel or the touch screen, and performs specific processing using software stored in the media reproducing apparatus. The touch panel may include, e.g., a resistive overlay touch panel, a surface acoustic wave touch panel, or an infrared beam touch panel. Such touch based interfacing is applied to a large sized electronic device such as a notebook and a TV, as well as a portable small electronic device such as a cellular phone, in addition to the above-described media reproducing apparatus.

The front portion of the media reproducing apparatus configured as the touch panel includes a channel input unit 110, a play/stop unit 120, a lamp display unit 130, a touch wheel button unit 140, a power unit 150, an external apparatus connection unit 160, an additional input unit 170, a camera control handling unit 180, and a tray opening/closing unit 190.

The channel input unit 110 is touched when a channel number is directly selected in a live mode in which the media reproducing apparatus displays an image or when a number is input in a number input mode.

The play/stop unit 120 performs the following five functions in connection with an image play and pause. "RCE" is touched to start or end recording. In ◀❙/◀◀, ◀❙ indicates a reverse operation and is touched during a reverse scene search in a pause mode, and ◀◀ indicates a reverse speed play and is touched during the reverse speed play. The ■ indicates a stop and is touched to stop playing the image. The ▶/❙❙ indicates a play/pause and is touched to pause or play a screen. In ▶▶/❙▶, ▶▶ indicates a forward speed play and is touched during the forward speed play, and ❙▶ indicates a forward operation and is touched during a forward scene search in the pause mode.

The lamp display unit 130 displays five statuses of the media reproduction apparatus using a lamp. "REC" indicates that the lamp is turn on when recording is on. "HDD" indicates a normal access of a hard disk drive. Thus, when the hard disk drive is accessed, the lamp repeatedly flicks. "ALARM" indicates that the lamp is turned on when an event occurs. "NETWORK" indicates that the lamp is turn on when the media reproduction apparatus accesses a network or transmits data over the network. "POWER" indicates that the lamp is turned on or flicks when the media reproduction apparatus is powered on/off. In the present embodiment, the lamp display unit 130 may not be implemented as the touch panel.

The touch wheel button unit 140 is touched when a set value is changed or a cursor moves, when a menu is selected or a select menu is executed, and when a jog/shuttle function is performed. In the present embodiment, the touch wheel button unit 140 may include up, down, left, and right buttons 141, 142, 143, and 144, or the up, down, left, and right buttons 141, 142, 143, and 144 and a select button 147. The touch wheel button unit 140 may not include the up, down, left, and right buttons 141, 142, 143, and 144, or the up, down, left, and right buttons 141, 142, 143, and 144 and the select button 147 to perform a jog or shuttle function only. A touch operation of the touch wheel button unit 140 and how to perform the touch operation will be described later with reference to FIGS. 3 through 7.

The power unit 150 is touched when the media reproduction apparatus is powered on or off. If the power unit 150 is touched for, e.g., two or more seconds, the media reproduction apparatus may be powered on or off.

The external apparatus connection unit 160 is used to connect the media reproduction apparatus to an external apparatus such as a universal serial bus (USB). In the present embodiment, the external apparatus connection unit 160 may not be implemented as the touch panel.

The additional input unit 170 performs the following five functions in connection with the operation of the media reproduction apparatus. "MODE" is touched when a live mode and a play mode are converted in a mode order. "AUDIO" is touched when sound is set on/off. "ALARM" is touched to release an alarm display lamp and an alarm sound when an alarm occurs and remove an icon. "MENU/⊃" is touched to enter a system menu screen or move from a menu screen to an upper menu. "ENTER" is touched when a selected menu is executed.

The camera control handling unit 180 performs the following four functions in connection with a camera control. "ZOOM" is touched when a screen expands 2 times in a digital mode. "FREEZE" is touched at a pause in the live mode. "BACKUP" is touched when a backup is performed. "SEARCH" is touched to enter a search screen.

The tray opening/closing unit 190 is touched when a tray is opened and closed.

Figure 2:
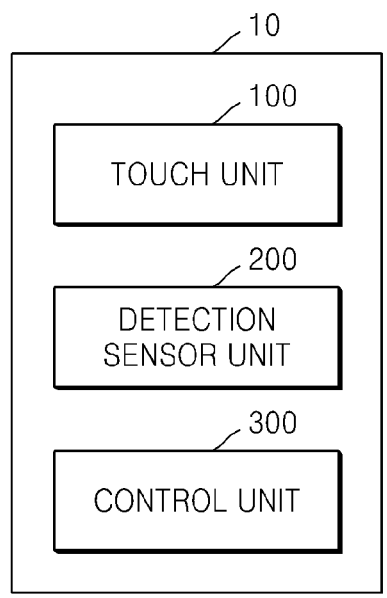
FIG. 2 is a block diagram of a touch based input device of a front portion included in the media reproducing apparatus of FIG. 1, according to an exemplary embodiment.

FIG. 2 is a block diagram of a touch based input device 10 of a front portion included in a media reproducing apparatus of FIG. 1. The touch based input device 10 of FIG. 2 is a part relating to information input and processing among a plurality of constitutional elements included in the media reproducing apparatus. Referring to FIG. 2, the touch based input device 10 includes a touch unit 100, a detection sensor unit 200, and a control unit 300.

The touch unit 100 is used to input a touch of information to perform an optional function, and corresponds to the channel input unit 100 or the tray opening/closing unit 190 of FIG. 1.

The detection sensor unit 200 is used to detect a touch of the touch unit 100. The detection sensor unit 200 may detect a touch time, a touch location, a touch speed, etc.

The control unit 300 may receive a touch detection result of the detection sensor unit 200 and perform an optional function. In other words, the control unit 300 may receive a detection signal from the detection sensor unit 200 and perform a specific function by using stored software.

In the present embodiment, if the information is input through the touch unit 100, the detection sensor unit 200 detects and transmits a type of the touch unit 100, a touch time, a touch location, etc., to the control unit 300. The control unit 300 operates according to a flow of performing the corresponding function. For example, if a user touches the power unit 150 included in the touch unit 100, the detection sensor unit 200 detects a touch time of the power unit 150, outputs the touch time to the control unit 300. When the touch time of the power unit 150 is 2 seconds, the control unit 300 turns on or off the media reproduction apparatus.

A touch and operation of the touch wheel button unit 140 including an additional jog/shuttle function will now be described with reference to FIGS. 3 through 8.

FIGS. 3A through 3C-2 are diagrams for explaining the touch wheel button unit 140 according to an embodiment. Referring to FIG. 3A, the touch wheel button unit 140 is a circular shape, but is not necessarily limited. The touch wheel button unit 140 includes the up, down, left, and right buttons 141, 142, 143, and 144. The up, down, left, and right buttons 141, 142, 143, and 144 are touched when a set value is changed or a cursor is moved up, down, left, and right, and when a predetermined menu is selected or the selected menu is executed. The up, down, left, and right buttons 141, 142, 143, and 144 are spaced apart from one another in a circumferential direction and are disposed on the exterior of a center part of a region of a front portion of a main body configured as a touch panel.

In FIGS. 3A through 3C-2, a first start point 145a for performing a jog function is disposed in a first region which is a space between the up button 141 and the right button 144. A second start point 146a for performing a shuttle function is disposed in a fourth region which is a space between the up button 141 and the left button 143. Although locations of the first start point 145a and the second start point 146a are fixed in the present embodiment, the locations may be switched to each other. Although the first start point 145a and the second start point 146a may be identifiable in the present embodiment, the start point 145a and the second start point 146a may not be identifiable. Alternatively, the start point 145a and the second start point 146a may be provided in a groove form to prevent a touch mistake.

FIGS. 3B-1 and 3B-2 are diagrams for explaining the jog function that is a first function performed by touching the first start point 145a. FIG. 3B-1 shows a dragging operation in the circumferential direction while the first start point 145a is touched. In this regard, touch times of the up, down, left, and right buttons 141, 142, 143, and 144 and touch/drag times of the first start point 145a may be previously set, in order to prevent the touch mistake by identifying the touches of the up, down, left, and right buttons 141, 142, 143, and 144 and the first start point 145a. For example, the touch time of each of the up, down, left, and right buttons 141, 142, 143, and 144 may be set to be shorter than 0.5 second, and the touch time of the first start point 145a and the drag time in the circumferential direction may be set to be longer than 0.5 second. The control unit 300 may count a touch time of the touch wheel button unit 140, when the touch time is shorter than 0.5 second, determines the touches of the up, down, left, and right buttons 141, 142, 143, and 144, and when the touch time is longer than 0.5 second, determines the touch of the first start point 145a.

Furthermore, a drag speed may be previously set when the first start point 145a is touched/dragged, in order to prevent an arbitrary touch/drag input of the first start point 145a. For example, touch/drag speed of the first start point 145a may be set as 20 m/s. The control unit 300 may calculate the touch/drag speed of the first start point 145a, if the touch/drag speed is lower than 20 m/s, invalidate the touch/drag input of the first start point 145a. Further, if the touch/drag speed is higher than 20 m/s, invalidate the touch/drag input of the first start point 145a.

As shown in FIG. 3B-1, if the drag operation is performed in one circumferential direction while the first start point 145a is touched, the touch detection unit 200 detects touch and drag operations of the first start point 145a, and the control unit 300 performs the jog function (a low speed screen search function) which moves an image frame reproduced on a screen of a media reproduction apparatus by one frame forward or backward. FIG. 3B-2 shows a drag operation in another circumferential direction while the first start point 145a is touched. As shown in FIG. 3B-2, if the drag operation is performed in another circumferential direction while the first start point 145a is touched, the touch detection unit 200 detects touch and drag operations of the first start point 145a, and the control unit 300 performs the jog function that moves the image frame reproduced on the screen of the media reproduction apparatus by one frame backward.

FIGS. 3C-1 and 3C-2 are diagrams for explaining the shuttle function that is a second function performed by touching the second start point 146a. FIG. 3C-1 shows a dragging operation in one circumferential direction while the second start point 146a is touched. In this regard, touch times of the up, down, left, and right buttons 141, 142, 143, and 144 and touch/drag times of the second start point 146a may be previously set. Furthermore, a drag speed of the second start point 146a may be previously set when the second start point 146a is touched/dragged, in order to prevent an arbitrary touch/drag input of the second start point 146a. As shown in FIG. 3C-1, if the drag operation is performed in one circumferential direction while the second start point 146a is touched, the touch detection unit 200 detects touch and drag operations of the second start point 146a, and the control unit 300 performs the shuttle function (a high speed screen search and fast play function) which reproduces the image frame, reproduced on the screen of the media reproduction apparatus, in double speed, e.g., 2 through 64 speed, forward or backward. FIG. 3C-2 shows a drag operation in another circumferential direction while the second start point 146a is touched. As shown in FIG. 3C-2, if the drag operation is performed in another circumferential direction while the second start point 146a is touched, the touch detection unit 200 detects touch and drag operations of the second start point 146a, and the control unit 300 performs the shuttle function which reproduces the image frame reproduced on the screen of the media reproduction apparatus double speed backward.

As described above, the new touch wheel button unit 140 which adds the jog/shuttle functions to the up, down, left, and right buttons 141, 142, 143, and 144 is implemented without including additional jog/shuttle buttons. Thus, the corresponding functions may be implemented without extending an area of a product, thereby providing a user with additional functions while maintaining a product cost.

FIGS. 4A through 4C-2 are diagrams for explaining the touch wheel button unit 140 according to another embodiment. Redundant descriptions between FIGS. 1 through 4C-2 are not provided here.

Figure 4A:
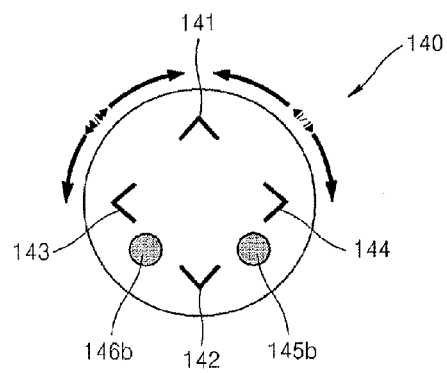

Referring to FIG. 4A, the touch wheel button unit 140 includes a first start point 145b for performing a jog function disposed in a second region which is a space between the down button 142 and the right button 144, and a second start point 146b for performing a shuttle function is disposed in a third region which is a space between the down button 142 and the left button 143.

Figures 1, 2, 4B:
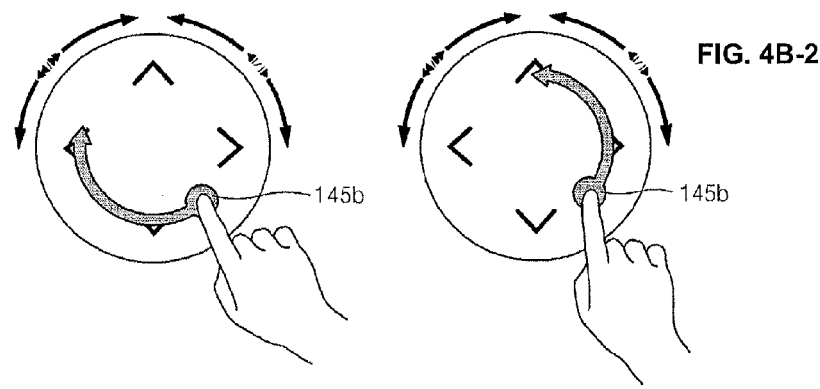

FIGS. 4B-1 and 4B-2 are diagrams for explaining a jog function which is a first function by touching the first start point 145b. FIGS. 4B-1 and 4B-2 show a drag operation in one circumferential direction or in another circumferential direction while the first start point 145b is touched. In this regard, touch times of the up, down, left, and right buttons 141, 142, 143, and 144 and touch/drag times of the first start point 145b may be previously set. Further, a drag speed may be previously set when the first start point 145b is touched/dragged, in order to prevent arbitrary touch/drag input of the first start point 145b. As shown in FIG. 4B-1 or 4B-2, if a drag operation is performed in one circumferential direction or in another circumferential direction while the first start point 145b is touched, the touch detection unit 200 detects touch and drag operations of the first start point 145b, and the control unit 300 performs the jog function that moves an image frame reproduced on a screen of a media reproduction apparatus by one frame forward or backward.

Figures 1, 2, 4C:
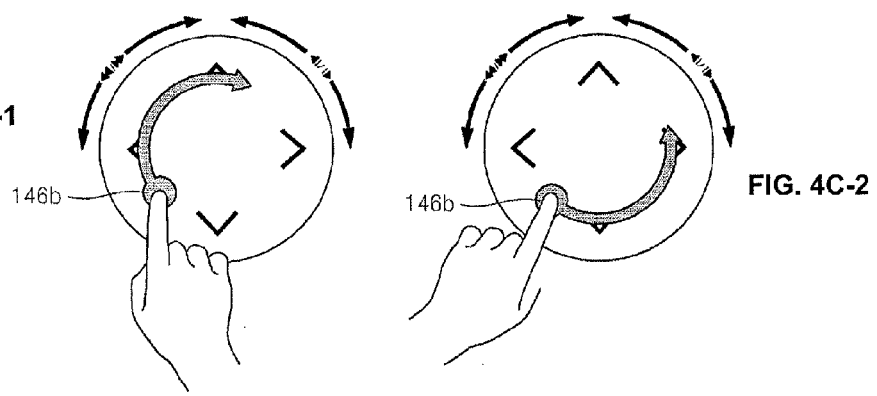

FIGS. 4C-1 and 4C-2 are diagrams for explaining the shuttle function that is a second function performed by touching the second start point 146b. FIGS. 4C-1 and 4C-2 show a drag operation in one circumferential direction or in another circumferential direction while the first start point 145b is touched. In this regard, touch times of the up, down, left, and right buttons 141, 142, 143, and 144 and touch/drag times of the second start point 146b may be previously set. Furthermore, a drag speed may be previously set when the second start point 146b is touched/dragged, in order to prevent arbitrary touch/drag input. As shown in FIGS. 4C-1 and 4C-2, if the drag operation is performed in one circumferential direction or in another circumferential direction while the first start point 145b is touched, the touch detection unit 200 detects touch and drag operations of the second start point 146b, and the control unit 300 performs the shuttle function that reproduces the image frame reproduced on the screen of the media reproduction apparatus double speed forward or backward.

FIGS. 5A through 5C-4 are diagrams for explaining the touch wheel button unit 140 according to another embodiment. Redundant descriptions between FIGS. 1 through 5C-4 are not provided here.

Figure 5A:
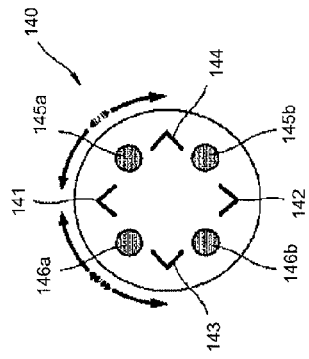
FIGS. 5A through 5C-4 are diagrams for explaining a touch wheel button unit according to another exemplary embodiment.

Referring to FIG. 5A, the touch wheel button unit 140 includes the first start points 145a and 145b for performing a jog function disposed in a first region that is a space between the up button 141 and the right button 144 and in a second region that is a space between the down button 142 and the right button 144, and the second start points 146a and 146b for performing a shuttle function is disposed in a third region that is a space between the up button 141 and the left button 143 and in a fourth region that is a space between the down button 142 and the left button 143.

Figures 4, 5B:
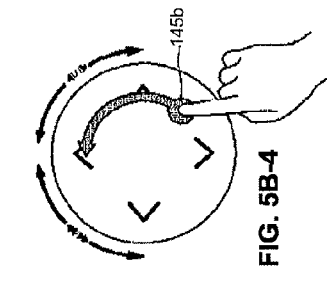

FIGS. 5B-1 through 5B-4 are diagrams for explaining a jog function that is a first function by touching the first start points 145a and 145b. FIGS. 5B-1 through 5B-4 show a drag operation in one circumferential direction or in another circumferential direction while the first start points 145a and 145b are touched. In this regard, touch times of the up, down, left, and right buttons 141, 142, 143, and 144 and touch/drag times of the first start points 145a and 145b may be previously set. Further, a drag speed may be previously set when the first start points 145a and 145b are touched/dragged, in order to prevent arbitrary touch/drag input of the first start points 145a and 145b. As shown in FIGS. 5B-1 through 5B-4, if a drag operation is performed in one circumferential direction or in another circumferential direction while the first start points 145a and 145b are touched, the touch detection unit 200 detects touch and drag operations of the first start points 145a and 145b, and the control unit 300 performs the jog function that moves an image frame reproduced on a screen of a media reproduction apparatus by one frame forward or backward.

Figures 3, 5B:
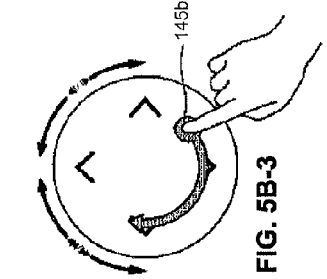
Figures 2, 5B:
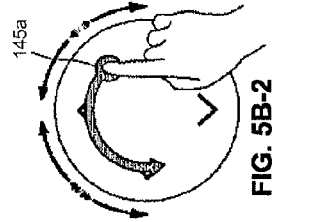
Figures 1, 5B:
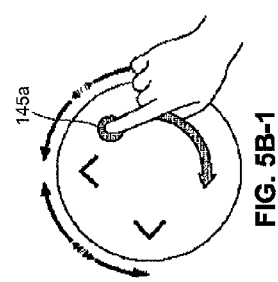
Figures 4, 5C:
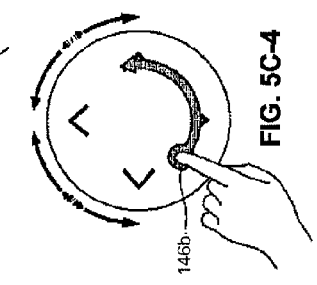
Figures 3, 5C:
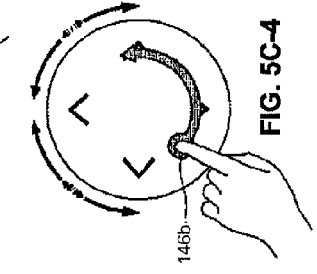
Figures 2, 5C:
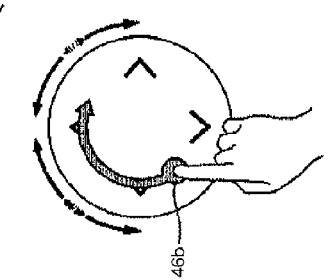
Figures 1, 5C:
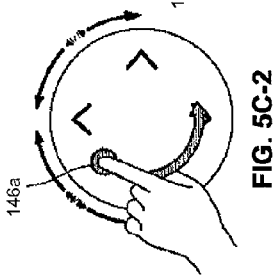

FIGS. 5C-1 and 5C-4 are diagrams for explaining a shuttle function that is a second function performed by touching the second start points 146a and 146b. FIGS. 5C-1 and 5C-4 show a drag operation in one circumferential direction or in another circumferential direction while the second start points 146a and 146b are touched. In this regard, touch times of the up, down, left, and right buttons 141, 142, 143, and 144 and touch/drag times of the second start points 146a and 146b may be previously set. Furthermore, a drag speed may be previously set when the second start points 146a and 146b are touched/dragged, in order to prevent arbitrary touch/drag input. As shown in FIGS. 5C-1 and 5C-4, if the drag operation is performed in one circumferential direction or in another circumferential direction while the second start points 146a and 146b are touched, the touch detection unit 200 detects touch and drag operations of the second start points 146a and 146b, and the control unit 300 performs the shuttle function, which reproduces the image frame reproduced on the screen of the media reproduction apparatus, in a double speed forward or backward.

Figure 6A:
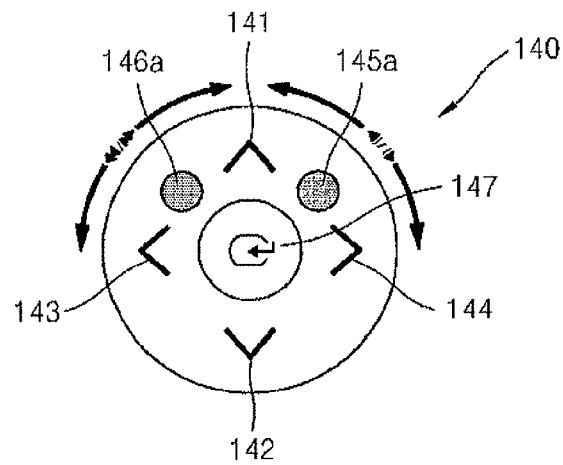
FIGS. 6A through 6C are diagrams for explaining a touch wheel button unit according to another exemplary embodiment.
Figure 6B:
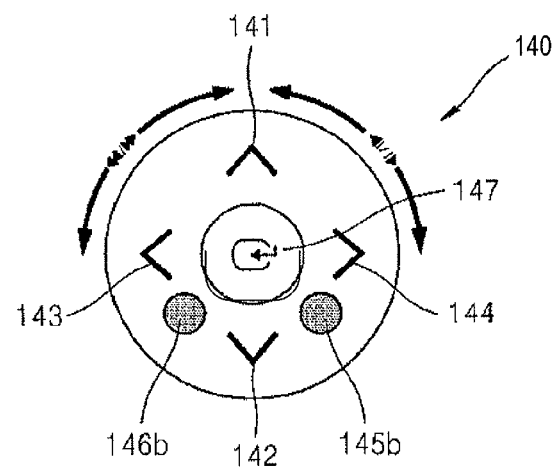
Figure 6C:
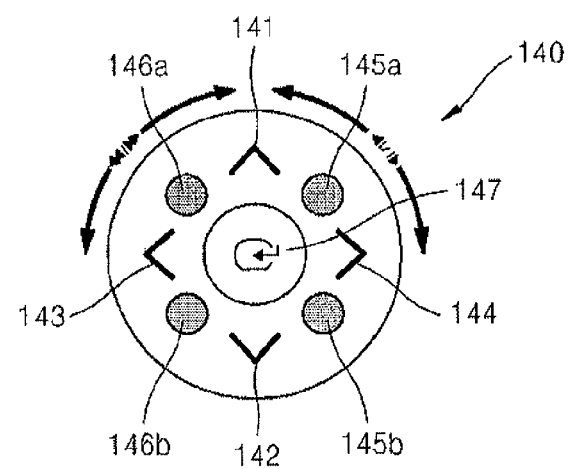

FIGS. 6A through 6C are diagrams for explaining the touch wheel button unit 140 according to another embodiment.

Referring to FIGS. 6A through 6C, the select button 147 is further included in a center portion of the touch wheel button unit 140 of FIGS. 3A through 5C-4. The select button 147 may be touched to input an execution according to touch input of the up, down, left, and right buttons 141, 142, 143, and 144.

The select button 147 is not limited to an execution of a function of the touch wheel button unit 140, and may be touched when the function is executed after another function is touched such as an execution of another touch input, e.g., after a channel is input, an execution to move the input channel.

FIGS. 7A through 7C-4 are diagrams for explaining the touch wheel button unit 140 according to another embodiment.

Referring to FIG. 7A, the touch wheel button unit 140 does not include the up, down, left, and right buttons 141, 142, 143, and 144 and the select button 147 but is divided into a first region 148 and a second region 149. The first region 148 includes the first start point 145a. The second region 149 includes the second start point 146a. The first region 148 and the second region 149 are identified as a right half and a left half of the touch wheel button unit 140, respectively, in the present embodiment. Locations of the first region 148 and the second region 149 may be changed according to locations of the first start point 145a and the second start point 146a. In other words, the first region 148 and the second region 149 need to include the first start point 145a and the second start point 146a, respectively.

FIGS. 7B-1 and 7B-2 are diagrams for explaining a jog function which is a first function by touching the first start point 145a or 145b in the first region 148. FIGS. 7B-1 and 7B-2 show a drag operation in one circumferential direction or in another circumferential direction while the first start point 145a in the first region 148 is touched. As shown in FIGS. 7B-1 and 7B-2, if the drag operation is performed in one circumferential direction or in another circumferential direction while the first start point 145a in the first region 148 is touched, the touch detection unit 200 detects touch and drag operations of the first start point 145a, and the control unit 300 performs the jog function that moves an image frame reproduced on a screen of a media reproduction apparatus by one frame forward or backward.

FIGS. 7B-3 and 7B-4 show a drag operation in one circumferential direction or in another circumferential direction while the first start point 145b in the first region 148 is touched. As shown in FIGS. 7B-3 and 7B-4, if the drag operation is performed in one circumferential direction or in another circumferential direction while the first start point 145*b* in the first region 148 is touched, the touch detection unit 200 detects touch and drag operations of the first start point 145*b*, and the control unit 300 performs the jog function that moves the image frame reproduced on the screen of the media reproduction apparatus by one frame forward or backward.

FIGS. 7C-1 through 7C-4 are diagrams for explaining a shuttle function which is a second function performed by touching the second start point 146*a* or 146*b* in the second region 149. FIGS. 7C-1 and 7C-2 show a drag operation in one circumferential direction or in another circumferential direction while the second start point 146*a* in the second region 149 is touched. As shown in FIGS. 7C-1 and 7C-2, if the drag operation is performed in one circumferential direction or in another circumferential direction while the second start point 146*a* in the second region 149 is touched, the touch detection unit 200 detects touch and drag operations of the second start point 146*a*, and the control unit 300 performs the shuttle function which reproduces the image frame reproduced on the screen of the media reproduction apparatus double speed forward or backward.

FIGS. 7C-3 and 7C-4 show a drag operation in one circumferential direction or in another circumferential direction while the second start point 146*b* in the second region 149 is touched. As shown in FIGS. 7C-3 and 7C-4, if the drag operation is performed in one circumferential direction or in another circumferential direction while the second start point 146*b* in the second region 149 is touched, the touch detection unit 200 detects touch and drag operations of the second start point 146*b*, and the control unit 300 performs the jog function which moves the image frame reproduced on the screen of the media reproduction apparatus by one frame forward or backward.

Referring to FIGS. 3A through 7C-4, the control unit 300 may output a first audio signal when the touch wheel button unit 140 for performing the first function is touched, output a second audio signal which is different from the first audio signal when the touch wheel button unit 140 for performing the second function is touched, and inform a user of a function which is being currently performed.

FIGS. 8A through 8D-2 are diagrams for explaining a touch wheel button unit 140 according to another embodiment. Referring to FIG. 8A, the touch wheel button unit 140 is divided into first through fourth regions 151-154. The first through fourth regions 151-154 may be spaced apart from one another in a circumferential direction. Although locations of the first start points 145*a* and 145*b* and the second start points 146*a* and 146*b* of the touch wheel button unit 140 of FIGS. 3A through 7C-4 are determined, locations of start points of the touch wheel button unit 140 of FIGS. 8A through 8D-2 are not determined.

FIGS. 8B-1 and 8B-2 are diagrams for explaining a jog function which is a first function of the touch wheel button unit 140. If a drag operation is performed from one of the first through fourth regions 151-154 as a touch start point to another region, the touch detection unit 200 detects touch and drag operations, and the control unit 300 performs the jog function which moves an image frame reproduced on a screen of a media reproduction apparatus by one frame forward or backward. The control unit 300 may output a first audio signal (e.g., buzzer sound one time) whenever a boundary line is touched during the drag operation when the first function is performed and notify a user that the first function is being currently performed.

In FIG. 8B-1, a drag operation is performed from the first region 151 of the touch wheel button unit 140 as a touch start point to the fourth region 154. The touch detection unit 200 receives touch and drag operations. The control unit 300 performs the jog function. In FIG. 8B-2, a drag operation is performed from the second region 152 of the touch wheel button unit 140 as a touch start point to the fourth region 154. The touch detection unit 200 receives touch and drag operations. The control unit 300 performs the jog function.

FIGS. 8C-1 and 8C-2 are diagrams for explaining a shuttle function which is a second function of the touch wheel button unit 140. If one of the first through fourth regions 151-154 is touched as a touch start point for a predetermined period of time (e.g., 2 seconds) and then a drag operation to at least another region is performed, the touch detection unit 200 counts a touch time and detects touch and drag operations, and the control unit 300 performs the shuttle function, which reproduces the image frame reproduced on the screen of the media reproduction apparatus, in double speed, forward or backward. The control unit 300 may output a 2-1 audio signal (e.g., buzzer sound two times) at a predetermined touch time in a current region and a 2-2 audio signal (e.g., buzzer sound one time) whenever a boundary line is touched during the drag operation when the second function is performed, and notify a user that the second function is being currently performed.

In FIG. 8C-1, if the first region 151 of the touch wheel button unit 140 is touched as a touch start point for a predetermined period of time and then a drag operation to the fourth region 154 is performed, the touch detection unit 200 counts a touch time and receives touch and drag operations, and the control unit 300 performs the shuttle function. In FIG. 8C-2, if the second region 152 of the touch wheel button unit 140 is touched as a touch start point for a predetermined period of time and then a drag operation to the fourth region 154 is performed, the touch detection unit 200 counts a touch time and receives touch and drag operations, and the control unit 300 performs the shuttle function.

FIGS. 8D-1 and 8D-2 are diagrams for explaining functions of up/down/left/right buttons of the touch wheel button unit 140. The first through fourth regions 151-154 may perform the functions of the up/down/left/right buttons. In other words, the first region 151 may correspond to the function of the up button. When the first region 151 is touched, the control unit 300 may perform an operation of the up button. The second region 152 may correspond to the function of the down button. When the second region 152 is touched, the control unit 300 may perform an operation of the down button. The third region 153 may correspond to the function of the left button. When the third region 153 is touched, the control unit 300 may perform an operation of the left button. The fourth region 154 may correspond to the function of the right button. When the fourth region 154 is touched, the control unit 300 may perform an operation of the right button. The control unit 300 may output a third audio signal (e.g., buzzer sound one time) whenever one of the first through fourth regions 151-154 is touched and notify a user that the functions of up/down/left/right buttons are being currently performed.

In FIG. 8D-1, if the first region 151 of the touch wheel button unit 140 is touched, the touch detection unit 200 receives a touch operation, and the control unit 300 performs the function of the up button. In FIG. 8D-2, if the fourth region 154 of the touch wheel button unit 140 is touched, the touch detection unit 200 receives a touch operation, and the control unit 300 performs the function of the right button. Furthermore, when a boundary line contacting each region of the touch wheel button unit 140 is touched so as to perform the functions of the up/down/left/right buttons, e.g., when a boundary line between the first region 151 and the fourth region 154 is touched, the control unit 300 performs the corresponding function with respect to the touched region preferentially.

Figure 9:
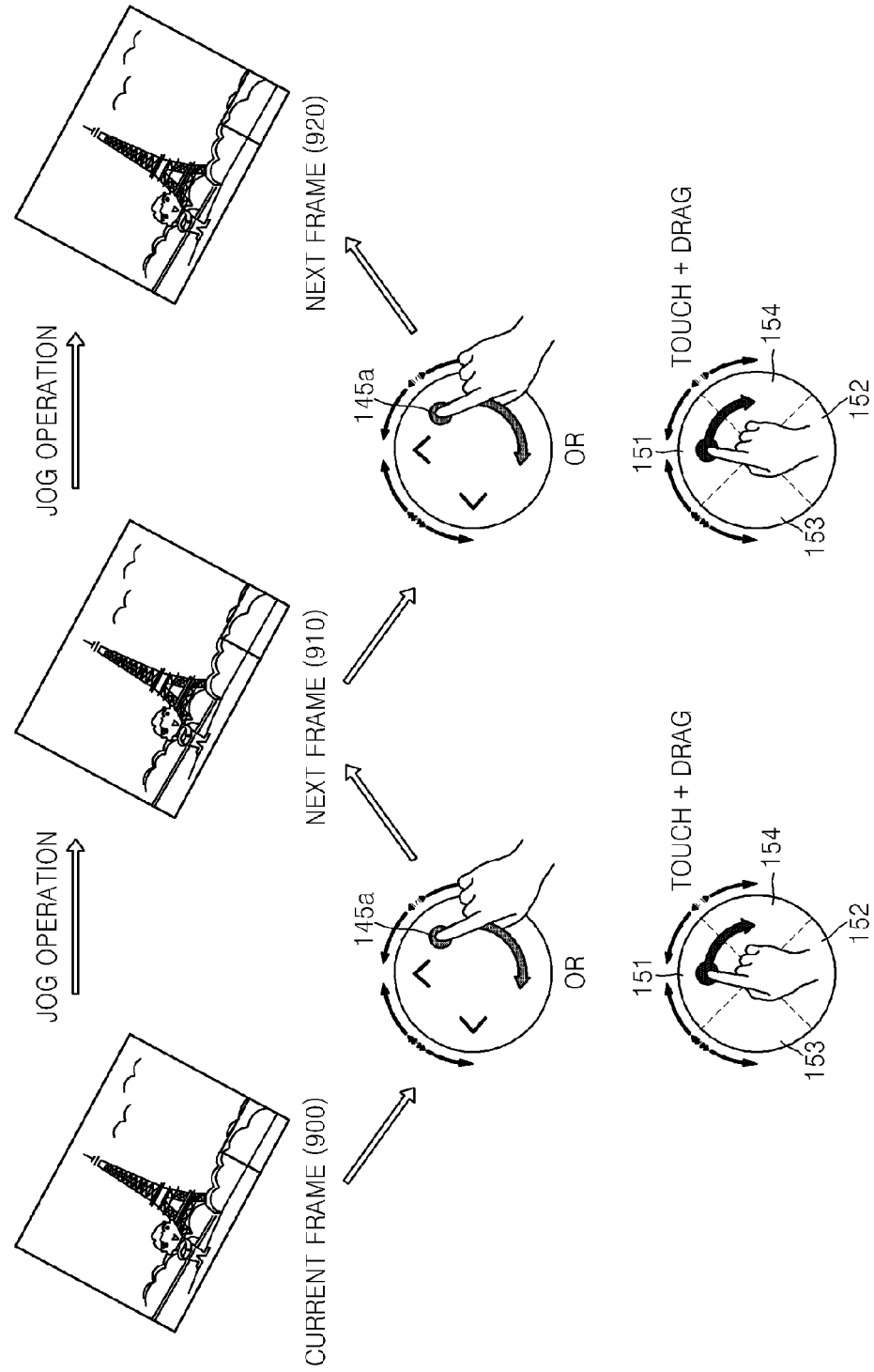
FIG. 9 is a diagram for explaining a jog operation according to manipulation of a touch wheel button unit according to an exemplary embodiment.

FIG. 9 is a diagram for explaining a jog operation and a shuttle operation according to manipulation of the touch wheel button unit 140 according to embodiments.

Referring to FIG. 9, if a drag operation is performed in one circumferential direction in a current image frame 900 while the first start point 145a or 145b of the touch wheel button unit 140 is touched, the touch detection unit 200 detects touch and drag operations, and the control unit 300 performs the jog function which moves the current image frame 900 by one frame forward. Alternatively, if a drag operation from one of the first through fourth regions 151-154 of the touch wheel button unit 140 as a touch start point to at least another region is performed, the touch detection unit 200 detects touch and drag operations, and the control unit 300 performs the jog function that moves an image frame reproduced on a screen of a media reproduction apparatus by one frame forward. As a result of performing the jog function in the current image frame 900, a next image frame 910 is displayed on the media reproduction apparatus.

In the same way, the jog function is performed in the next image frame 910 by using touch and drag operations of the touch wheel button unit 140. Thus, a next image frame 920 is displayed on the media reproduction apparatus.

Figure 10:
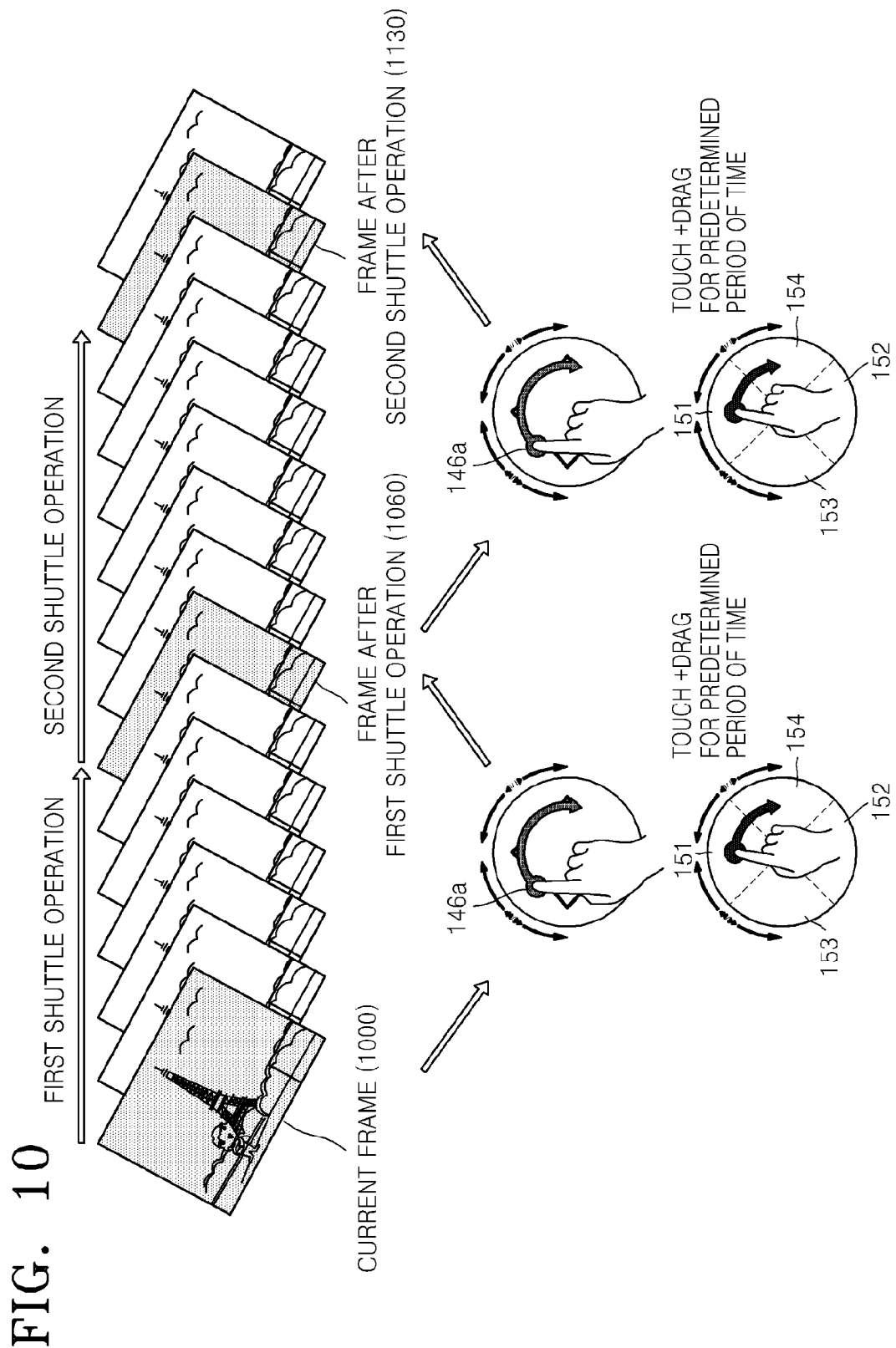
FIG. 10 is a diagram for explaining a shuttle operation according to manipulation of a touch wheel button unit according to an exemplary embodiment.

Referring to FIG. 10, if a drag operation is performed in one circumferential direction in a current image frame 1000 while the second start point 146a or 146b of the touch wheel button unit 140 is touched, the touch detection unit 200 detects touch and drag operations, and the control unit 300 performs the shuttle function that carries out a high speed search from the current image frame 1000 forward. Alternatively, if one of the first through fourth regions 151-154 of the touch wheel button unit 140 is touched as a touch start point for a predetermined period of time (e.g., 2 seconds) in the current image frame 1000 and then a drag operation to at least another region is performed, the touch detection unit 200 counts a touch time and detects touch and drag operations, and the control unit 300 performs the shuttle function that carries out a high speed search from the current image frame 1000 forward. As a result of performing the shuttle function in the current image frame 1000, an image frame 1060 after a first shuttle operation is displayed on the media reproduction apparatus. In this regard, the image frame 1060 after the first shuttle operation may be a frame at a time when the shuttle operation that starts in the current image frame 1000 ends.

In the same way, the shuttle function is performed in the image frame 1060 after the first shuttle operation using touch and drag operations of the touch wheel button unit 140. Thus, an image frame 1130 after a second shuttle operation is displayed on the media reproduction apparatus. In this regard, the image frame 1130 after the second shuttle operation may be a frame at a time when the shuttle operation which starts in the image frame 1060 after the first shuttle operation ends.

As described above, the media reproduction apparatus includes the touch wheel button unit 140 configured as a touch panel in a region thereof and performing a plurality of functions. Thus, the plurality of functions may be implemented using a single touch wheel button without extending an area of the touch panel. Thus, a user is provided with an additional function while maintaining a product cost.

A media reproduction method according to an embodiment will now be described with reference to FIGS. 11 and 12. The media reproduction method according to an embodiment may be internally performed in the input device 10 of the media reproduction apparatus of FIG. 1. A main algorithm of the media reproduction method may be internally performed in the control unit 300 using peripheral constitutional elements according to an embodiment. Redundant descriptions between FIGS. 1 through 10 will be omitted here.

Figure 11:
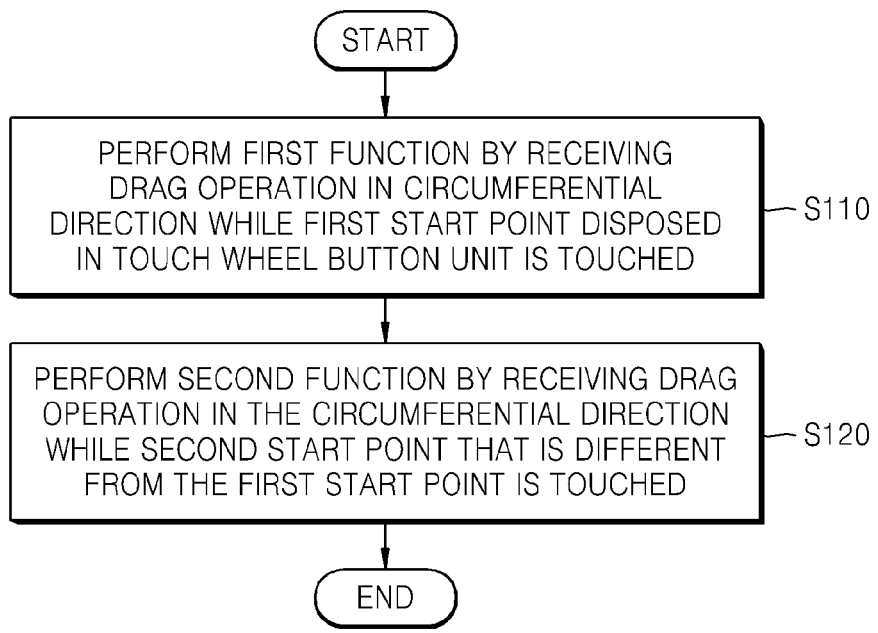
FIG. 11 is a flowchart of a media reproduction method according to an exemplary embodiment.

FIG. 11 is a flowchart of a media reproduction method according to an embodiment.

Referring to FIG. 11, the control unit 300 receives a drag operation in a circumferential direction while the first start points 145a and 145b disposed in the touch wheel button unit 140 are touched, and performs an operation S110 which performs a first function as a jog function.

In this regard, the touch wheel button unit 140 may include up/down/left/right buttons. The first start points 145a and 145b disposed in the touch wheel button unit 140 may be disposed in a space between the up button 141 and the right button 144 and/or in a space between the down button 142 and the right button 144. The second start point 146a of the touch wheel button unit 140 may be disposed in a space between the up button 141 and the left button 143 and/or in a space between the down button 142 and the left button 143. The control unit 300 may output a first audio signal when the touch wheel button unit 140 is touched to perform the first function, and notify a user of a function that is currently being performed.

The control unit 300 receives a drag operation in the circumferential direction while the second start points 146a and 146b that are different from the first start points 145a and 145b disposed in the touch wheel button unit 140 are touched and performs an operation S120 that performs a second function as a shuttle function.

In this regard, the control unit 300 may output a second audio signal which is different from the first audio signal when the touch wheel button unit 140 is touched to perform the second function, and notify the user of a function that is currently being performed.

Figure 12:
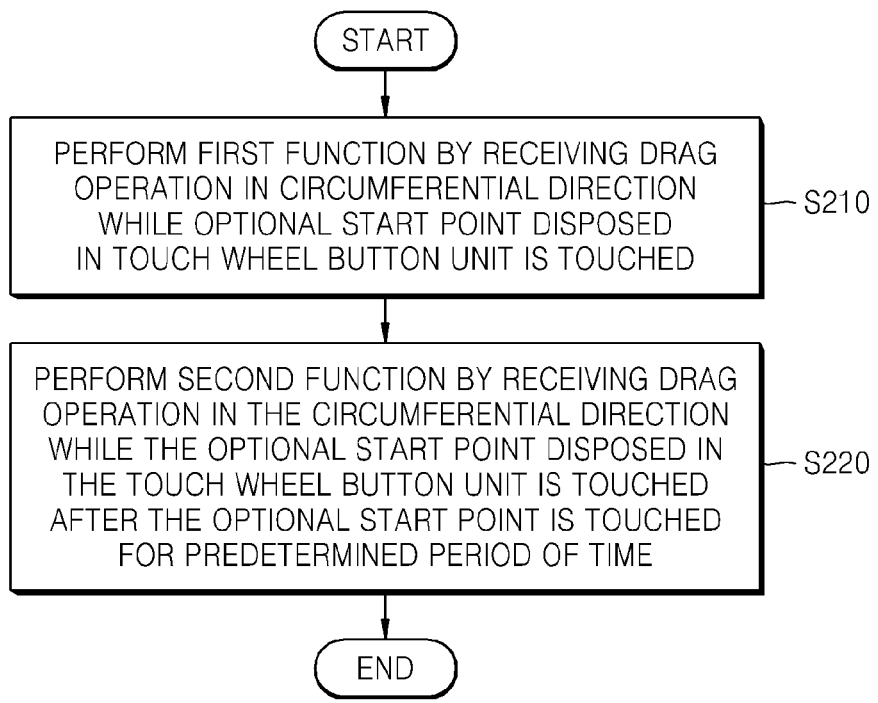
FIG. 12 is a flowchart of a media reproduction method according to another exemplary embodiment.

FIG. 12 is a flowchart of a media reproduction method according to another embodiment.

Referring to FIG. 12, the control unit 300 receives a drag operation in a circumferential direction while an optional start point disposed in the touch wheel button unit 140 is touched, and performs an operation S210 which performs a first function as a jog function.

In this regard, the touch wheel button unit 140 may be divided into the first through fourth regions 151-154 spaced apart from one another in the circumferential direction. Although locations of the first start points 145a and 145b and the second start points 146a and 146b of the touch wheel button unit 140 of FIG. 9 are determined, locations of start points of the touch wheel button unit 140 of the present embodiment are not determined. In other words, the control unit 300 receives a drag operation from one of the first through fourth regions 151-154 as a touch start point to at least another region, and performs the first function. The control unit 300 may output a first audio signal when the touch wheel button unit 140 is touched to perform the first function, and notify a user of a function which is currently being performed.

The control unit 300 receives a drag operation in a circumferential direction after an optional start point, disposed in the touch wheel button unit 140, is touched for a predetermined period of time, and performs an operation S220 which performs a second function as a shuttle function.

In other words, the control unit 300 receives a drag operation from one of the first through fourth regions 151-154 which is touched for a predetermined period of time as a touch start point to at least another region, and performs the second function. The control unit 300 may output a second audio signal, which is different from the first audio signal, when the touch wheel button unit 140 is touched to perform the second function and notify the user of a function which is currently being performed.

Furthermore, the first through fourth regions 151-154 may perform functions of up/down/left/right buttons. In other words, when the first region 151 is touched, the control unit 300 may perform an operation of the up button. When the second region 152 is touched, the control unit 300 may perform an operation of the down button. When the third region 153 is touched, the control unit 300 may perform an operation of the left button. When the fourth region 154 is touched, the control unit 300 may perform an operation of the right button. The control unit 300 may output a third audio signal whenever one of the first through fourth regions 151-154 is touched, and notify a user that the functions of up/down/left/right buttons are being currently performed.

As described above, according to the one or more of the exemplary embodiments, a media reproducing apparatus includes a touch wheel which is configured as a touch panel in a region of the media reproducing apparatus, and performs a plurality of functions. The plurality of functions may be implemented using the touch wheel button without having to extend an area of the touch panel. Therefore, a user is provided with an additional function without having to increase a product cost.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A media reproduction apparatus comprising:
    a main body;
    a touch wheel button unit comprising four directional buttons and a selection button that are disposed in a touch panel of the main body, the touch panel being divided by boundary lines into four regions; and
    a control unit configured to perform a first function in response to receiving a first drag operation which starts from a first start point in one of the four regions on the touch wheel button unit, and perform a second function, which is different from the first function, in response to receiving a second drag operation which starts from a second start point in one of the four regions, which is different from the first start point, on the touch wheel button unit,
    wherein the four regions are spaced apart from one another in a circumferential direction and respectively disposed between two of the four directional buttons,
    wherein at least two of the four regions comprise the first start point, and two other regions besides the at least two regions comprise the second start point,
    wherein the control unit is further configured to output a first audio signal whenever each of the boundary lines is touched during the first drag operation, and output a second audio signal whenever each of the boundary lines is touched during the second drag operation, and
    wherein the first function is a jog function and the second function is a shuttle function.

2. The media reproduction apparatus of claim 1, wherein the four regions comprises:
    a first region which comprises the first start point; and
    a second region which comprises the second start point.

3. The media reproduction apparatus of claim 1,
    wherein the first start point and the second start point are indicated to be distinguished from each other in the touch wheel button.

4. The media reproduction apparatus of claim 1, wherein at least one region of the four regions comprises the first start point, and at least one another region of the four regions comprises the second start point.

5. The media reproduction apparatus of claim 1, wherein the selection button is disposed in an inner center portion of the four directional buttons.

6. The media reproduction apparatus of claim 1,
    wherein the control unit is configured to perform the first function in response to receiving a drag operation that starts in one region of the four regions and ends in another region of the four regions.

7. The media reproduction apparatus of claim 1,
    wherein the control unit is configured to perform the second function in response to receiving a drag operation from one region of the four regions, as a touch start point, to at least another region of the four regions while the one region is touched, after the one region is touched for a predetermined period of time.

8. The media reproduction apparatus of claim 1, wherein the control unit is configured to perform a function of a button corresponding to a firstly touched region in response to receiving a touch signal of one of the boundary lines.

9. The media reproduction apparatus of claim 1, wherein the control unit is configured to output a third audio signal when at least one of the four directional buttons are touched.

10. A media reproduction method using a touch wheel button unit comprising four directional buttons and a selection button that are disposed in a touch panel of a media reproduction apparatus, and the touch panel being divided by boundary lines into multiple regions comprising a first region, a second region, a third region, and a fourth region, the media reproduction method comprising:
    performing a first function in response to receiving a first drag operation which starts from a first start point in one of the four regions on the touch wheel button unit; and
    performing a second function, which is different from the first function, in response to receiving a second drag operation which starts from a second start point in one of the four regions, which is different from the first start point, on the touch wheel button unit,
    wherein the four regions are spaced apart from one another in a circumferential direction and respectively disposed between two of the four directional buttons,
    wherein at least two of the four regions comprise the first start point, and two other regions besides the at least two regions comprise the second start point,
    wherein the performing the first function comprises outputting a first audio signal whenever each of the boundary lines is touched during the first drag operation,
    wherein the performing the second function comprises outputting a second audio signal whenever each of the boundary lines is touched during the second drag operation, and
    wherein the first function is a jog function and the second function is a shuttle function.

11. The media reproduction method of claim 10, further comprising:
performing a function of a corresponding button in response to receiving a touch signal of one of the four directional buttons.

12. The media reproduction method of claim 10, wherein at least one region of the four regions comprises the first start point, and at least one another region of the four regions comprises the second start point.

13. The media reproduction method of claim 10, further comprising:
performing the first function in response to receiving a drag operation that starts in one region of the four regions and ends in another region of the four regions.

14. The media reproduction method of claim 10, further comprising:
performing the second function in response to receiving a drag operation that starts in one region of the four regions and ends in another region of the four regions,
wherein the one region is touched for a predetermined period of time.

15. The media reproduction method of claim 10, further comprising:
performing a function of a button corresponding to a firstly touched region in response to receiving a touch signal of one of the boundary lines.

16. The media reproduction method of claim 10, further comprising:
outputting a third audio signal when at least one of the four directional buttons is touched.

* * * * *